H. A. MILLER.
STARTING DEVICE FOR AUTOMOBILE ENGINES.
APPLICATION FILED APR. 5, 1915.
1,160,637.
Patented Nov. 16, 1915.
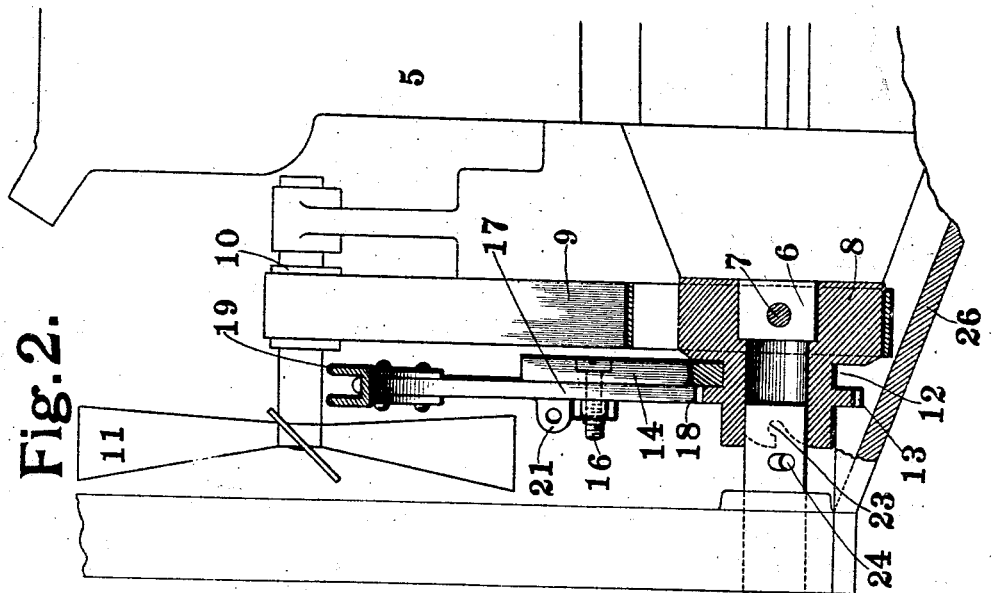
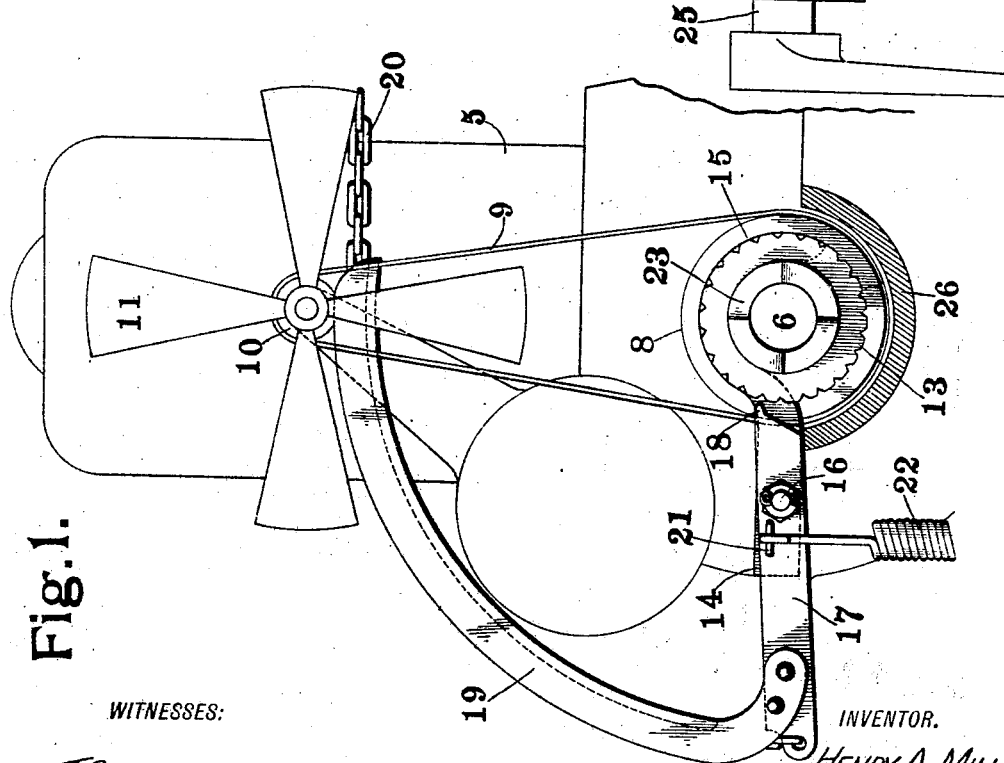
WITNESSES:
INVENTOR.
HENRY A. MILLER,
BY
ATTORNEY

UNITED STATES PATENT OFFICE.

HENRY A. MILLER, OF MEMPHIS, MISSOURI.

STARTING DEVICE FOR AUTOMOBILE-ENGINES.

1,160,637. Specification of Letters Patent. Patented Nov. 16, 1915.

Application filed April 5, 1915. Serial No. 19,164.

*To all whom it may concern:*

Be it known that I, HENRY A. MILLER, a citizen of the United States of America, residing at Memphis, county of Scotland, State of Missouri, have invented a certain new and useful Starting Device for Automobile-Engines, of which the following is such a full, clear, and exact description as will enable any one skilled in the art to which it appertains to make and use the same, reference being had to the accompanying drawings, forming part of this specification.

My invention relates to starting devices for automobile engines and has for its object the production of a starting device which will be simple in construction and which can be readily applied to existing types of cars.

A further object of my invention is to so construct my device that the operating connections can be readily disconnected to give access to other mechanism.

In the accompanying drawings, which illustrate one form of starting device made in accordance with my invention, together with a portion of the engine to which it is applied, Figure 1 is an end view and Fig. 2 is a side elevation partly in section.

Like marks of reference refer to similar parts in both views of the drawings.

5 is a diagrammatic representation of an engine to which my device is applied. The engine 5 is provided with a crank shaft 6 to which is secured by means of a pin 7 a pulley 8 which takes the place of the usual belt pulley for driving the fan. Passing around this pulley 8 is a belt 9 which also passes around the pulley 10 on the shaft of the fan 11. The pulley 8 is provided with a projecting portion in which is formed an annular groove 12 and adjacent to this groove 12 a toothed wheel 13.

14 is an operating lever, the inner end 15 of which is substantially semicircular in shape, and fits into the groove 12. Pivoted to the lever 14 by means of a bolt 16 is a second lever 17, the inner end of which is provided with a dog 18 adapted to engage with the teeth of the wheel 13. Secured to the outer end of the lever 17 is a grooved sector 19 in which is arranged a chain 20 or other flexible connections passing over the pulleys to a position within reach of the driver of the engine. Carried on the lever 17 is a lug 21 to which is attached one end of a coil spring 22, the other end of which is attached to any suitable portion of the machine. The outer end of the projection carried by the pulley 8 is provided with teeth 23 adapted to be engaged by a pin 24 carried by the usual starting crank 25 so that the engine may also be cranked in the ordinary manner. The lower edge of the inner end of the lever 17 projects somewhat below the edge of the lever 14 when the dog 18 is in engagement with the wheel 13. This projecting edge is adapted to come in contact with the support 26 of the engine when the parts are returned to their normal position and thus throw the dog 18 out of engagement with the wheel 13. The operation of my device is as follows: The parts, when in their normal position, are as shown in Fig. 1. When the chain 20 is actuated by the operation of the lever 17, it is first turned on its pivot 16 so as to throw the dog 18 into engagement with the wheel 13. The further movement of the chain causes the levers to rotate the member 8 and, consequently, the crank shaft of engine. When the parts are released, the lower edge of the lever 17 comes in contact with the support 26 and throws the dog out of engagement with the wheel. This will also occur in case of a back-fire.

It will be evident that my device is very simple in construction and, at the same time, very effective in operation, as the force applied to turning the crank shaft at the same time draws the dog 18 firmly into engagement with the wheel 13. Owing to this fact, the wheel 13 may be made without teeth if desired. I prefer, however, to use a toothed wheel. Inasmuch as the inner end of the lever 14 embraces only one-half of the member 8, this lever, together with the attached parts, may be readily lifted out of position to give access to the engine. The grooved sector 19 forms a continuation of the lever 17 and affords means by which the leverage is maintained constant throughout the movement of the parts. The use of the grooved sector not only maintains the leverage constant but, at the same time, allows the chain to run in the same line from the forward end of the lever to the pulley. It will be evident, therefore, that by the use of this device, the operation of starting is performed more readily from the seat of the car than by cranking in the front of the car in the usual way. My device not only enables the car to be readily started from the seat, but it also greatly decreases the danger to the operator from back-firing of the engine.

Having fully described my invention, what I claim as new and desire to secure by Letters-Patent of the United States is:

1. In a starting device for automobiles, the combination with an engine shaft, of a horizontally arranged lever embracing one-half only of the shaft, whereby the said lever may be removed from said shaft by a lateral movement, yielding means for retaining said lever in engagement with said shaft, a second lever pivoted to the first named lever and coöperating therewith to operatively engage with and rotate said shaft, and connections for actuating said second named lever.

2. In a starting device for automobiles, the combination with an engine shaft, of a member secured to said shaft and provided with an annular groove and a wheel, a horizontally arranged lever entering said groove and embracing one-half only of the shaft, whereby said lever may be removed from said shaft by a lateral movement, and a second lever pivoted to the said first named lever and provided with a dog for engaging with said wheel, a spring attached to one of the said levers for maintaining engagement with the shaft, and connections for operating said second named lever.

3. In a starting device for automobiles, the combination with an engine shaft, a lever mounted on said shaft, a second lever pivoted to the said first named lever and provided with a dog adapted to be operatively connected with and rotate said shaft, said second lever having a portion projecting beyond the said first named lever, a stop adapted to contact with the projecting portion of the said second named lever to disengage said dog and to contact with said first named lever to limit its movement.

4. In a starting device for automobiles, the combination with an engine shaft, of a member secured to said shaft and provided with an annular groove and a wheel, a horizontal lever entering the said groove and embracing substantially one-half of the shaft, whereby the said lever may be detached from the shaft by a lateral movement, a second lever pivoted to the said first named lever and provided with a dog for engaging the said wheel, said second lever having its lower edge projecting beyond the edge of the said first named lever, and a stop adapted to contact with said projecting portion to release the said dog from the said wheel and to contact with the said first named lever to limit its movement, and a spring normally holding the said first named lever against the said stops.

In testimony whereof, I have hereunto set my hand and affixed my seal in the presence of the two subscribing witnesses.

HENRY A. MILLER. [L. S.]

Witnesses:
JOSEPH H. MYERS,
J. L. HAMMOND.